United States Patent [19]

Davis

[11] Patent Number: 5,187,138

[45] Date of Patent: Feb. 16, 1993

[54] SILICA MODIFIED HYDROISOMERIZATION CATALYST

[75] Inventor: Stephen M. Davis, Baton Rouge, La.

[73] Assignee: Exxon Research and Engineering Company, Florham Park, N.J.

[21] Appl. No.: 760,266

[22] Filed: Sep. 16, 1991

[51] Int. Cl.$^5$ .................. B01J 21/12; B01J 23/68; B01J 23/88
[52] U.S. Cl. .................. 502/255; 502/258; 502/263
[58] Field of Search .................. 502/263, 255, 258

[56] References Cited

U.S. PATENT DOCUMENTS

| | | | |
|---|---|---|---|
| 4,547,283 | 10/1985 | Neel et al. | 502/263 |
| 4,677,095 | 6/1987 | Wan et al. | 502/263 |
| 4,778,779 | 10/1988 | Murrell et al. | 502/263 |
| 4,837,193 | 6/1989 | Akizuki et al. | 502/263 |

FOREIGN PATENT DOCUMENTS 2121698  1/1984  United Kingdom ........ 502/263

*Primary Examiner*—Carl F. Dees
*Attorney, Agent, or Firm*—Jay Simon

[57] ABSTRACT

A catalyst useful for hydroisomerizing wax containing feeds comprises a Group VIII metal on an alumina or silica-alumina support having less than about 35 wt % silica and is surface treated with at least about 0.5 wt % silica or a silica precursor.

13 Claims, 4 Drawing Sheets

SILICA MODIFIED HYDROISOMERIZATION CATALYST

FIELD OF THE INVENTION

This invention relates to a silica modified catalyst and its use in hydrocarbon isomerization. More particularly, this invention relates to catalysts containing Group VIII noble or non-noble metals, e.g., nickel, cobalt, platinum, or palladium, on a silica-alumina support wherein the catalyst is modified by the addition of silica. The additional silica is not a part of the bulk silica used in the support, i.e, not part of the backbone or framework of a silica-alumina support, but is employed as a surface modifying agent, increasing the acidity of the catalyst and promoting improved isomerization of hydrocarbons, particularly waxy hydrocarbons produced by the Fischer-Tropsch process or as a result of dewaxing of oils.

BACKGROUND OF THE INVENTION

Normal paraffin waxes produced either from Fischer-Tropsch hydrocarbon synthesis or as a result of dewaxing oils, e.g., lubricating oils, are valuable starting materials for a variety of processes. The lack of sulfur or nitrogen contaminants in these materials makes them particularly desirable where high purity hydrocarbons are required. However, these materials are difficult to transport because they are solid at room temperature. Fischer-Tropsch waxes, for example, may be produced at remote sites and refined at existing refineries in industrialized areas. In order to move the wax to the refinery, the wax must be pumpable, thereby reducing transportation costs. One way of achieving the pumpable form of the wax is to isomerize the normal paraffins produced by the process to a more branched product that is liquid at room temperature, and therefore, more easily transportable.

Isomerization processes are well known and are usually conducted in the presence of hydrogen and a suitable isomerization catalyst at isomerization conditions, which include elevated temperatures and pressures.

As recently reported, see U.S. Pat. No. 4,832,819, hydroisomerization catalysts useful for the purposes disclosed herein contain platinum, fluoride, and alumina. However, fluoride tends to be stripped from the catalyst with use and makeup fluoride must be added constantly to the reaction zone for maintaining activity and selectivity of the catalyst. Also, environmental concerns favor replacing fluoride containing materials where there is any tendency for the fluoride to escape the refinery as a fluorine containing gas.

Also, U.S. Pat. Nos. 3,843,509 and 4,139,494 describe silica-alumina materials that are useful, and preferred as the support materials for this invention, the disclosures of which are hereby incorporated by reference. Preferred materials are also shown in U.S. Pat. No. 4,837,193, the catalyst description thereon being incorporated herein by reference.

SUMMARY OF THE INVENTION

In accordance with the invention, wax containing feeds, particularly slack waxes and Fisher-Tropsch waxes, are isomerized at isomerization conditions including elevated temperatures and pressures, hydrogen, and with a surface silica modified catalyst containing catalytically active amounts of a Group VIII noble or non-noble metal supported on a refractory oxide support. Amorphous alumina or silica-alumina supports containing no more than about 35% $SiO_2$ are preferred. While the silica used as the surface modifying agent is chemically similar to the silica in the bulk catalyst support, the use of silica as a surface modifying agent rather than in the bulk support changes both the activity and selectivity of the catalyst. For example, a silica-alumina catalyst with a total silica content of 20 wt% all in bulk silica will act quite differently from a silica-alumina catalyst with 10 wt% silica in the bulk support and 10 wt% silica added as a surface modifying agent.

The silica used as a surface modifying agent adds somewhat different acidity to the catalyst than if a like amount is used in the bulk support. While the reason for the improvement in catalyst activity and selectivity is not fully appreciated, it is likely due primarily to increased surface acidity. However, studies also show that the use of surface modifying silica inhibits reduction of the catalytic metal and less of the metal is reduced to the zero valence state. Some of the catalytic metal may be reacting with the surface modifying silica, thereby producing relatively stable surface silicate compounds, e.g., $NiSiO_3$, which are more difficultly reducible than binary metal oxides.

A major result of employing the silica as a surface modifying agent is enhanced cold flow properties, e.g., freeze point, particularly the pour point, of the resulting isomerate, resulting from increased branching of the product vis-a-vis the feed. Other beneficial effects include improved catalyst activity and reduced selectivity for dry gas (i.e., light gas production.

DESCRIPTION OF THE DRAWINGS

FIG. 3 summarizes reaction temperatures (3A), jet freeze points (3B), and diesel cetane numbers (3C) as a function of 700° F.+ conversion.

The silica surface modifying agent can be added to the support before or after the catalytic metals are added, preferably after addition of the metals. Any suitable silicon containing compound can be used as the source of silica. For example, a preferred silica source is ethyl orthosilicate [$Si(OCO_2H_5)_4$] in an isopropanol carrier. However, such silica sources as silanes, colloidal silica, silicon chlorides, or other inorganic silicon salts may also be used.

Following impregnation with the silica source, the catalyst is dried at temperatures up to about 125° C. and calcined at temperatures ranging from about 300°–500° C., preferably 350°–450° C. Calcination is effected in an oxygen containing atmosphere and converts the silicon containing source to silica.

The amount of silica used as a surface modifying agent is that sufficient to achieve an improvement in cold flow properties of the isomerate. Thus, at least about 0.5 wt%, preferably at least about 1 wt% of silica is added to the catalyst either as silica or a silica source. More preferably, silica additions should range from about 1 to 25 wt%, still more preferably about 2 to 12 wt%, still more preferably about 4-10 wt%. Higher amounts of silica, e.g., above about 12 wt% may tend to promote hydrocracking to naphtha range products, and catalyst performance, insofar as the overall balance between improved cold flow properties and product selectivity is concerned, is not improved. Moreover, at loadings above about 20 wt%, silica tends to fill the catalyst pore volume and limit access of reactant molecules to catalyst sites.

The total silica content of the catalyst, that is, support silica plus added surface modifying silica is preferably about 10-25 wt%, more preferably 14-20 wt%.

The active hydroisomerization metals are selected from Group VIII of the Periodic chart of the elements. The metals may be of the noble or non-noble class. Preferred non-noble Group VIII metals are nickel and cobalt or mixtures thereof and mixtures thereof with molybdenum, a Group VI metal. Preferred Group VIII noble metals are platinum and palladium. The Group VIII metals may be present on the catalyst in amounts sufficient to be catalytically active for hydroisomerization. Specifically, metal concentrations ranging from about 0.05 to about 20 wt%, preferably about 0.1 to 10 wt%, still more preferably 0.2 to 1.0 wt% may be used. For example, in a preferred catalyst the cobalt loading may be 1-4 wt%, and the nickel loading may be 0.1-1.5 wt%. When non-noble metals are employed a Group VI metal such as molybdenum can be employed in amounts more or less than or equal to the non-noble Group VIII metal, e.g., 1.0 to 20 wt%, preferably 8-15 wt% in all cases by total weight of catalyst.

The metals are impregnated onto or added to the support as suitable metal salts or acids, e.g., chloroplatinic acid, nickel or cobalt nitrate, etc. The catalyst is then dried and calcined, preferably prior to addition of the silica.

The base silica and alumina materials used in this invention may be, for example, soluble silicon containing compounds such as alkali metal silicates (preferably where $Na_2O:SiO_2 = 1:2$ to 1:4), tetraalkoxysilane, orthosilicic acid ester, etc.; sulfates, nitrates, or chlorides of aluminum alkali metal aluminates, or inorganic or organic salts of alkoxides or the like. For precipitating the hydrates of silica or alumina from a solution of such starting materials, a suitable acid or base is added and the pH is set within the range of 6.0 to 11.0. Precipitation and aging are carried out, with heating, by adding an acid or base under reflux to prevent evaporation of the treating liquid and change of pH. The remainder of the support producing process is the same as those commonly employed, including filtering, drying, and calcination of the support material. The support may also contain small amounts, e.g., 1-30 wt% of materials such as magnesia, titania, zirconia, hafnia, or the like.

A preferred support is an amorphous silica-alumina carrier, containing about 2-35 wt% silica, more preferably 5 to 30 wt% silica, and having the following porestructural characteristics:

| Pore Radius (A) | Pore Volume |
|---|---|
| 0-300 | >0.03 ml/g |
| 100-75,000 | <0.35 ml/g |
| 0-30 | <25% of the volume of the pores with 0-300 A radius |
| 100-300 | <40% of the volume of the pores with 0-300 A radius |

Such materials and their preparation are described more fully in U.S. Pat. No. 3,843,509 incorporated herein by reference. The materials have a surface area ranging from about 180-400 m²/g, preferably 230-350 m²/g, a pore volume of 0.3 to 1.0 ml/g, preferably 0.35 to 0.75 ml/g, bulk density of about 0.5-1.0 g/ml, and a side crushing strength of about 0.8 to 3.5 kg/mm.

Surface silica modified materials typically display a small reduction in surface area, pore volume, and average pore size, e.g., on the order of 5-15%.

The feed materials that are isomerized with the catalyst of this invention are waxy feeds boiling above about 350° F. preferably above about 550° F. and may be obtained either from a Fischer-Tropsch process which produces substantially normal paraffins or from slack waxes. Slack waxes are the by-products of dewaxing operations where a diluent such as propane or a ketone (e.g., methylethyl ketone, methyl isobutyl ketone) or other diluent is employed to promote wax crystal growth, the wax being removed from the lubricating oil base stock by filtration or other suitable means. The slack waxes are generally paraffinic in nature, boil above about 600° F., preferably in the range of 600° F. to about 1050° F., and may contain from 1 to 35 wt% oil. Waxes with low oil contents, e.g., 5-20 wt% are preferred; however, waxy distillates or raffinates containing 5-45% wax may also be used as feeds. Slack waxes are usually freed of polynuclear aromatics and heteroatom compounds by techniques known in the art, e.g., mild hydrotreating as described in U.S. Pat. No. 4,900,707, which also reduces sulfur and nitrogen levels preferably to less than 5 ppm and less than 2 ppm, respectively.

Isomerization conditions include temperatures of 300°-400° C., 500-3000 psig hydrogen, 1000-10,000 SCF/bbl hydrogen treat and space velocity of 0.1-10.0 LHSV. Preferred conditions include 320°-385° C., 1000-1500 psig hydrogen, 0.5-2 v/v/hr.

The catalyst is generally employed in a particulate form, e.g., cylindrical extrudates, trilobes, quadrilobes, and ranging in size from about 1-5 mm. The hydroisomerization can be carried out in a fixed bed reactor and the products may be recovered by distillation.

The following examples will serve to further illustrate this invention.

All catalyst experiments were carried out in an upflow reactor with 0.375 inch OD reactors in a sand bath. Unless otherwise specified, experiments were carried out at 1000 psig, 0.45-0.55 LHSV, temperatures of 650°-750° F. and a hydrogen treat gas of 2500-3500 SCF/bbl. Quadrilobe extrudates were crushed and sized to 14/35 mesh. Balances were typically collected at 48-100 hour intervals.

Product distributions were determined by topping the total liquid product to 700° F. in a 15/5 column followed by measuring the oil content of the 700° F.+ fraction with MEK/toluene extraction. Boiling ranges for gas, naphtha and distillates were obtained from combination gcd-ms gas analyses. Pour points and freeze points for distillate range products were obtained from the 15/5 distillations using ASTM analytical methods. Carbon, hydrogen and distillate cetane were measured by NMR; methyl content of selected products was also obtained by NMR.

Silica promotion was accomplished by impregnating the catalyst or support with enough ethyl orthosilicate, $Si(OC_2H_5)_4$ in isopropanol to fill the pore volumes unless otherwise specified, using the incipient wetness technique followed by air drying at room temperature for about 16 hours, vacuum drying at 110° C. for 16 hours, and air calcination in a muffle furnace for 1-4 hours at 450° C. Catalysts with alternate metals were produced by impregnating the support with aqueous solutions of $Ni(NO_3)_2$, $Pd(NH_3)_4(NO_3)_2$, or $H_2PtCl_6$ followed by drying and calcination at 840° F.

EXAMPLE 1

Table I is a comparison of product distributions and product quality for wax isomerization with a full range Fischer-Tropsch wax. As indicated in the table, the wax contained 91% waxy hydrocarbons boiling above 550° F. Wax conversion was maintained at 60-86% by adjusting reaction temperature.

TABLE I

Product Distributions and Product Quality Data For Fischer-Tropsch Wax Isomerization

| Catalyst | Feed | A | A | A + 4 wt % $SiO_2$ | | A + 10 wt % $SiO_2$ | |
|---|---|---|---|---|---|---|---|
| T (°F.) | | 717 | 717 | 694 | 700 | 669 | 671 |
| Gas Rate (SCF/bbl) | | 6000 | 3200 | 2600 | 2500 | 3100 | 3000 |
| Yield on Feed (Wt. %) | | | | | | | |
| $C_1$-$C_4$ | — | 0.94 | 0.56 | 0.74 | 0.90 | 0.80 | 2.96 |
| $C_5$/320 | 2.0 | 1.92 | 1.58 | 3.17 | 5.23 | 4.35 | 6.22 |
| 320/550 | 7.0 | 16.1 | 16.4 | 14.2 | 15.0 | 15.7 | 18.2 |
| 550/700 | 12.5 | 21.5 | 18.3 | 18.6 | 17.8 | 15.0 | 16.8 |
| 700+-DWO | — | 43.8 | 39.5 | 46.4 | 40.2 | 41.6 | 38.3 |
| 700+-Wax | 78.5 | 15.5 | 23.3 | 16.9 | 19.9 | 22.7 | 17.7 |
| 320/550 Properties | | | | | | | |
| API (°F.) | | 54.2 | 54.3 | 55.0 | 54.6 | 54.6 | 54.3 |
| Freeze Pt (°F.) | | +1 | +3 | −27 | −23 | −26 | −30 |
| 320/700 Properties | | | | | | | |
| API (°F.) | | 50.0 | 50.3 | 50.5 | 50.4 | 51.0 | 50.5 |
| Pour Pt (°F.) | | 21 | 21 | −11.2 | −11.2 | −16.6 | −27 |
| Cloud Pt (°F.) | | 45 | 42 | 7.7 | 20 | 14 | 10 |
| Cetane NMR | | 75.0 | 74.9 | 66.9 | 66.8 | 64.7 | 65.8 |

@ 1000 PSIG, 0.46 LHSV, 150-1000 hour on oil.

The data of Table I show increasing silica addition as compared to Catalyst A without silica modification resulted in:

significantly lower reaction temperatures for achieving wax conversion, thereby reflecting a higher level of catalyst activity for silica modified catalysts;

a slight increase in naphtha and light distillate yields and slight decrease in dewaxed lube oil and heavy distillates;

substantial improvement in product pour properties, specifically reducing the 320°/550° F. freeze points by 20° F.+ and even greater reductions in the 320°/700° F. pour points.

Table II shows the branchiness effect of isomerizing a $C_{14}$-$C_{17}$ Fischer-Tropsch paraffin wax over Catalyst A, a silica modified Catalyst A, and silica modified palladium and platinum catalysts on a 10 wt% silica-alumina base (B).

TABLE II

Methyl Content of Isomerate by NMR

| | Methyl Content (% Total Carbon) at | |
|---|---|---|
| Catalyst | 77-82% 550+ Conversion | 97-98% 550+ Conversion |
| A | 16.9 | 21.3 |
| 4% $SiO_2$ + A | 20.6 | 23.9 |
| 4% $SiO_2$/0.8 Pd/B | 21.1 | 27.5 |
| 4% $SiO_2$/0.6 Pt/B | 21.2 | 27.6 |

At both conversion conditions the silica modified catalysts showed increased methyl content of the isomerate, an indication of increased branching.

Table III shows yield patterns for Fischer-Tropsch wax with Catalyst A where the silica concentration in the support (not surface modifying silica) was varied from 10% (Catalyst A) to 25% to 50%.

TABLE III

| Catalyst | A | A/50% $SiO_2$—$Al_2O_3$ | A/25% $SiO_2$—$Al_2O_3$ | | |
|---|---|---|---|---|---|
| LHSV | 0.46 | 0.92 | 0.55 | 0.55 | 0.55 |
| 700+ Wax Conversion (%) | 72 | 80 | 67 | 77 | 94 |
| Yield on Feed (Wt. %) | | | | | |
| $CH_4$ | 0.14 | 0.13 | 0.06 | 0.48 | 1.7 |
| $C_2/C_4$ | 0.77 | 18.0 | 1.4 | 1.5 | 1.8 |
| $C_5$/320 | 3.4 | 26.9 | 7.4 | 7.1 | 6.3 |
| 320/550 | 12.8 | 23.7 | 15.4 | 16.9 | 21.2 |
| 550/700 | 16.1 | 13.7 | 16.1 | 17.1 | 20.5 |
| 700+-DWO | 45.5 | 3.7 | 34.3 | 39.1 | 44.1 |
| TLP Pour Point (°F.) | 32 | 64 | 59 | 37 | −6 |
| 320/550 Freeze Pt (°F.) | −8 | −15 | −13 | −6 | −20 |
| 320/700 Pour Pt (°F.) | +10 | +27 | +10 | +16 | −6 |

TABLE III-continued

| Catalyst | A | A/50% SiO$_2$—Al$_2$O$_3$ | | A/25% SiO$_2$—Al$_2$O$_3$ | |
|---|---|---|---|---|---|
| 320/700 Cetane (NMR) | 72 | 66 | 70 | — | 67 |

@ 1000 psig, 726-727° F., 3000 SCF/bbl

The data show that supports having 50 wt% silica degrade product quality by significantly increasing gas and naphtha yields and decreasing total liquid distillate yield.

Table IV shows yield patterns and product qualities for silica modified noble metal catalysts.

TABLE IV

| Catalyst | A | 4% SiO$_2$/ 0.8 wt. % Pd/B | 4% SiO$_2$ 0.6 wt. % Pt/B | A + 4% SiO$_2$ |
|---|---|---|---|---|---|
| Reaction Temp (°F.) | 728 | 712 | 725 | 705 | 694 |
| 700+ Wax Conversion (%) | 72 | 73 | 86 | 81 | 78 |
| Yield on Feed (Wt. %) | | | | | |
| CH$_4$ | 0.14 | 0.02 | 0.09 | 0.08 | 0.05 |
| CH2/CH$_4$ | 0.77 | 1.0 | 1.67 | 0.87 | 0.69 |
| C$_5$/320 | 3.4 | 5.5 | 8.4 | 4.1 | 3.2 |
| 320/550 | 12.8 | 22.0 | 29.3 | 19.3 | 14.2 |
| 550/700 | 16.1 | 18.0 | 22.4 | 19.9 | 18.6 |
| 700+-DWO | 45.5 | 32.9 | 27.4 | 40.9 | 46.4 |
| 320/550 Freeze Pt (°F.) | −8 | −26 | −35 | −20 | −27 |
| 550/700 Pour Pt (°F.) | +10 (320/700) | −17 | −27 | −11 | −11 (320/700) |
| 550/700 Cetane (NMR) | 72 (320/700) | 67 | 65 | 69 | 67 (320/700) |

@ 1000 psig, 0.5 LHSV, 3000 SCF/bbl
B = 10 wt % SiO$_2$—Al$_2$O$_3$

The results in Table IV show:
a silica modified non-noble metal catalyst produces enhanced product qualities as compared to a Catalyst A without silica modification;

both noble metal, silica modified catalysts showed improved catalytic activity as compared to the non-noble metal, non-silica modified catalyst at similar conversion levels.

Table V shows a product distribution comparison for non-noble metal silica-alumina (Catalyst A), silica modified Catalyst A, and noble metals on the Catalyst A base with silica modification for isomerizing a C$_{14}$-C$_{17}$ Fischer-Tropsch wax at moderate conversion and high conversion.

TABLE V

| Catalyst | A | 4% SiO$_2$ + A | 4% SiO$_2$/ 0.8 Pd/B | 4% SiO$_2$/ 0.6 Pt/B |
|---|---|---|---|---|
| A. Moderate 550+ Conversion | | | | |
| Reaction T (°F.) | 658 | 656 | 656 | 656 |
| 550+ Conversion (%) | 78 | 80 | 72 | 78 |
| Product Yields, (Wt. %) | | | | |
| CH$_4$ | 4.1 | 2.1 | 0.01 | 0.015 |
| C$_2$/C$_4$ | 1.6 | 1.4 | 0.61 | 0.65 |
| C$_5$/320 | 8.7 | 6.4 | 3.9 | 4.9 |
| 320/550 | 69 | 77 | 84 | 84 |
| B. High 550+ Conversion | | | | |
| Reaction T (°F.) | 674 | 674 | 671 | 672 |
| 550+ Conversion (%) | 93 | 92 | 88 | 90 |
| Product Yields (Wt. %) | | | | |
| CH$_4$ | 9.1 | 4.7 | 0.01 | 0.04 |
| C$_2$/C$_4$ | 3.1 | 2.5 | 1.31 | 1.56 |
| C$_5$/320 | 14.7 | 14.4 | 9.0 | 11.1 |
| 320/550 | 54 | 62 | 80 | 77 |

@ 1000 psig, 0.5 LHSV, 3000 SCF/bbl
B = 10 wt % SiO$_2$—Al$_2$O$_3$ a silica modified platinum catalyst on 10 wt% silica-alumina showed slightly increased total liquid yield as compared to the non-noble metal Catalyst A and enhanced product qualities, although not quite as good as the silica modified non-noble metal catalyst;

a silica modified palladium catalyst on 10 wt% silica-alumina showed product qualities equal to or better than the silica modified non-noble metal catalyst;

The results show reduced gas make with the noble metal, silica modified catalysts and increasing 320/550 liquid yields. Relative to Catalyst A, the silica modified non-noble metal catalyst also showed reduced gas and naphtha, although not as low as that achieved with the noble metal catalysts.

Table VI shows product distribution and distillate properties for a 10 wt% silica-alumina catalyst support (B), with nickel as the active metal isomerization catalyst. The feed was the same full range Fischer-Tropsch wax described in connection with Example 1.

TABLE VI

| Catalyst | 3% Ni/B | | 4% SiO$_2$/3% Ni/B | | 4% SiO$_2$/1% Ni/B | |
|---|---|---|---|---|---|---|
| Reaction T (°F.) | 718 | 713 | 722 | 718 | 713 | 722 |

TABLE VI-continued

| Catalyst | 3% Ni/B | | 4% SiO₂/3% Ni/B | | 4% SiO₂/1% Ni/B | |
|---|---|---|---|---|---|---|
| Wax Conversion (%) | 70.0 | 74.5 | 85.5 | 91.0 | 72 | 89.5 |
| Yield on Feed (Wt. %) | | | | | | |
| CH₄ | 11.8 | 10.4 | 8.0 | 4.3 | 0.03 | 0.06 |
| C₂/C₄ | 2.5 | 1.8 | 3.1 | 1.6 | 2.0 | 4.8 |
| C₅/320 | 8.3 | 8.7 | 7.8 | 8.6 | 7.9 | 12.0 |
| 320/550 | 28.2 | 30.0 | 23.4 | 31.7 | 23.7 | 32.1 |
| 550/700 | 19.3 | 21.5 | 18.7 | 20.6 | 18.9 | 20.7 |
| 700+-DWO | 8.3 | 9.6 | 28.8 | 26.9 | 26.1 | 22.6 |
| 320/550 Freeze Pt (°F.) | +1.4 | +1.4 | −24 | −27 | −13 | −24 |
| 550/700 Pour Pt (°F.) | +32 | 32 | −11 | −17 | +10 | −6 |
| 550/700 Cetane (NMR) | 78 | 78 | 69 | 67 | 71 | 69 |

@ 1000 psig, 0.5 LHSV, 3000 SCF/bbl.
B = 10 wt % SiO₂—Al₂O₃

The data shows that nickel, too, on the silica modified, silica-alumina base, increases wax conversion, increases total liquid yield, and substantially improves freeze point and pour point as compared to a non-silica modified catalyst. Methane yields are also lowered for the surface silica containing catalyst.

EXAMPLE 2

Surface Silica Promoted Alumina Based Catalyst

Previous examples have considered surface silica promotion of catalysts containing metals supported silica-alumina carriers. This example illustrates that surface silica promotion can also be applied with alumina based catalysts. The data in this example and subsequent examples were obtained using a Fischer-Tropsch wax with a slightly different boiling range distribution than previously described.

Three catalysts were investigated for wax isomerization and pour point reduction. The first catalyst was a commercially produced CoMo/Al₂O₃ catalyst (AKZO KF-742) containing about 3.0 wt% cobalt and 11.0 wt% molybdenum. This catalyst was impregnated with 0.5 wt% nickel using aqueous nickel nitrate followed by drying and air calcination at 450° C. for two hours. The second catalyst (Catalyst #2) was derived from the first by impregnating the CoNiMo/Al₂O₃ catalyst with ethylorthosilicate in isopropanol to give a silicon loading of about 5 wt% (10 wt% silica). The catalyst was dried in air, then overnight in vacuum at 100° C., and finally calcined in air at 400° C. for 3-4 hours. The third catalyst (Catalyst #3) was a standard reference material having the following composition and characteristics: 18 wt% MoO₃, 4 wt% CoO, 0.7 wt% NiO on SiO₂-Al₂O₃ carrier (with 10 wt% SiO₂ in the carrier): surface area ranged between 276-297 m²/g and pore volume was 0.47 cc/g. (Catalyst 3 is the same as Catalyst A in Example 1.)

Table VII compares the catalytic behavior of the surface silica promoted CoNiMo/Al₂O₃ catalyst with that for Catalyst #3. Data for the unpromoted CoNiMo/Al₂O₃ first catalyst are not included because under the same reaction conditions, this catalyst was not active for wax pour point reduction and isomerization at temperatures up to 755° F. (e.g., the product stream remained a hard wax). On this basis, it is evident that silica is required for catalytic activity in wax isomerization. Comparison of the data for catalysts containing bulk and surface silica shows that SiO₂/CoNiMo/Al₂O₃ displayed slightly better activity than catalyst #3 for 700+ wax conversion. More importantly, the surface silica promoted catalyst produced distillate products with improved cold flow properties, particularly 320°/550° F. boiling range jet fuel type products. The surface silica containing catalyst also produced less C₄- gas, although this was balanced by increased naphtha production.

TABLE VII

| | CATALYTIC BEHAVIOR OF BULK VERSUS SURFACE SILICA | | | | | | |
|---|---|---|---|---|---|---|---|
| CATALYST | FEED | CATALYST #3 | | | CATALYST #2 | | |
| Rxn T (F.) | | 733 | 740 | 745 | 730 | 739 | 749 |
| 700+ Conversion | | 8.6 | 20 | 30 | 15 | 34 | 52 |
| Yields (wt %) | | | | | | | |
| C₁/C₄ | | 0.50 | 1.5 | 2.5 | 0.56 | 0.86 | 1.2 |
| C₅/320 | | 0.86 | 1.5 | 2.8 | 1.7 | 3.6 | 6.5 |
| 320/550 | 3.8 | 7.7 | 12.6 | 16.3 | 10.0 | 16.8 | 23.9 |
| 550/700 | 19.2 | 21.3 | 24.9 | 27.7 | 23.1 | 29.0 | 33.2 |
| 700+ | 77.0 | 70.5 | 61.7 | 53.9 | 65.7 | 51.1 | 37.3 |
| Cold Flow Properties (°F.) | | | | | | | |
| 320/550 Freeze Pt (°F.) | | 12 | −0.4 | −13 | −21 | −24 | −33 |
| 550/700 Freeze Pt (°F.) | | 59 | 48 | 43 | 48 | 32 | −12 |

EXAMPLE 3

Surface Versus Bulk Silica

To address the effectiveness of surface silica versus bulk silica, another series of comparisons was carried out using catalysts with variable composition. In this case, silica-alumina supports with 20 and 30 wt% bulk silica loadings were obtained from a commercial catalyst supplier that were specifically prepared to exhibit physical properties closely resembling the unmodified 10% silica support of catalyst 3 in Example 2. These supports were impregnated with 3.0 wt% cobalt and 0.5 wt% nickel using aqueous nitrates followed by drying and calcination at 450° C. Subsequently, the catalysts were loaded with 12 wt% molybdenum by impregnation of aqueous ammonium heptamolybdate followed by drying and air calcination at 500° C. for 3 hours. These catalysts are subsequently indicated by CoNiMo/20%SiO₂-Al₂O₃ (c) and CoNiMo/30%SiO₂-Al₂O₃ (d). The behavior of these catalysts was investigated in direct comparison to surface silica promoted CoNiMo/10%SiO2-Al2O3 catalysts (same as catalyst #3 in Example 2) containing 8 and 16 wt% surface silica, or total silica loadings of 18 and 26 wt%, respectively. Table VIII summarizes the observed catalytic behavior.

TABLE VIII
COMPARISON OF SURFACE AND BULK SILICA CONTAINING CATALYSTS

| CATALYST | C | | D | | 8% SiO2/ CATALYST #3 | | 16% SiO2/ CATALYST #3 | |
|---|---|---|---|---|---|---|---|---|
| Rxn T (F.) | 685 | 705 | 685 | 705 | 685 | 696 | 662 | 668 |
| 700+ Conv. (%) | 6.1 | 46 | 14 | 44 | 18 | 44 | 26 | 40 |
| Yields (wt %) | | | | | | | | |
| C1/C4 | 0.4 | 3.5 | 0.43 | 1.6 | 0.8 | 2.4 | 0.8 | 1.7 |
| C5/320 | 0.65 | 5.7 | 1.4 | 5.6 | 1.4 | 4.7 | 2.8 | 4.8 |
| 320/550 | 5.9 | 21.8 | 9.9 | 20.7 | 10.5 | 21.1 | 14.8 | 21.3 |
| 550/700 | 21.6 | 32.4 | 22.8 | 31.4 | 25.4 | 31.8 | 25.7 | 27.9 |
| 700+ | 72.5 | 41.1 | 66.7 | 43.2 | 63.2 | 43.4 | 57.1 | 46.0 |
| 320/550 Freeze Point (F.) | 9 | −31 | 0 | −21 | −9 | −31 | −20 | −31 |
| 550/700 Pour Point (F.) | 59 | −11 | 48 | −11 | 27 | −11 | 10 | −11 |

Figure 1:
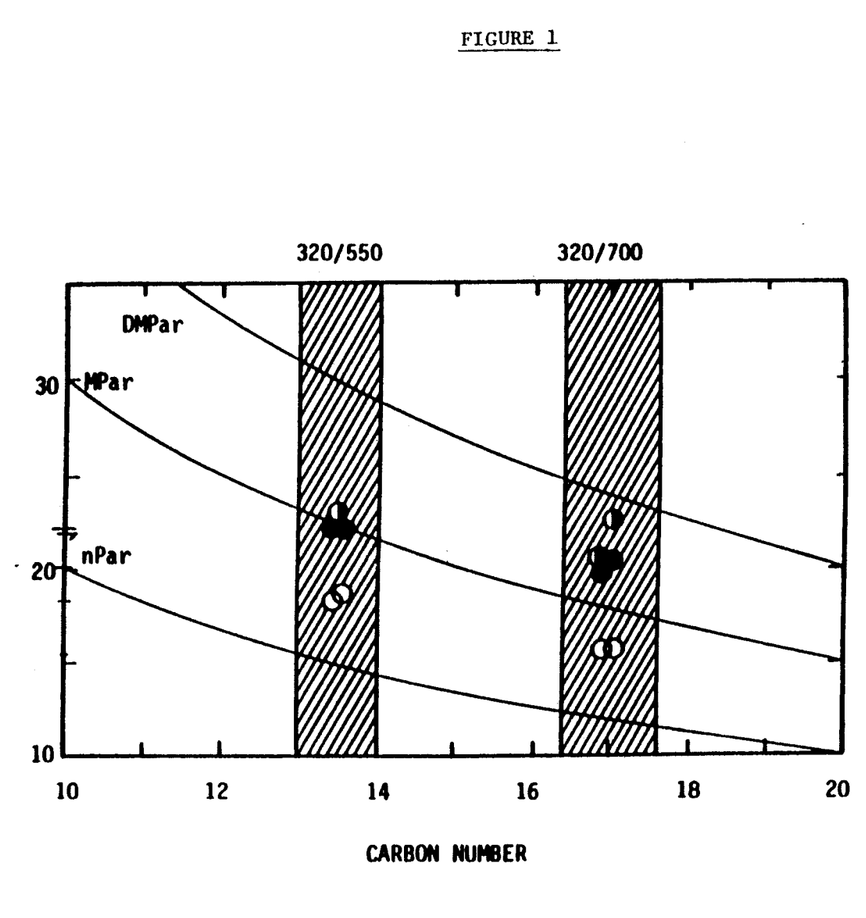
FIG. 1 is a correlation of methyl content (ordinate) as measured by NMR with product (isomerate) branchiness and shows a higher degree of branchiness in products isomerized via a silica surface modified catalyst. Catalyst A (open circles) was a typical silica-alumina catalyst having 10 wt% silica with 0.5 wt% Ni, 2.5 wt% Co, and 12 wt% Mo. Methyl content was measured for a 320°/550° F. product and a 320°/700° F. product. The half filled circles are 4% $SiO_2$+A, and the darkened circles are 10% $SiO_2$+A.
Figure 2:
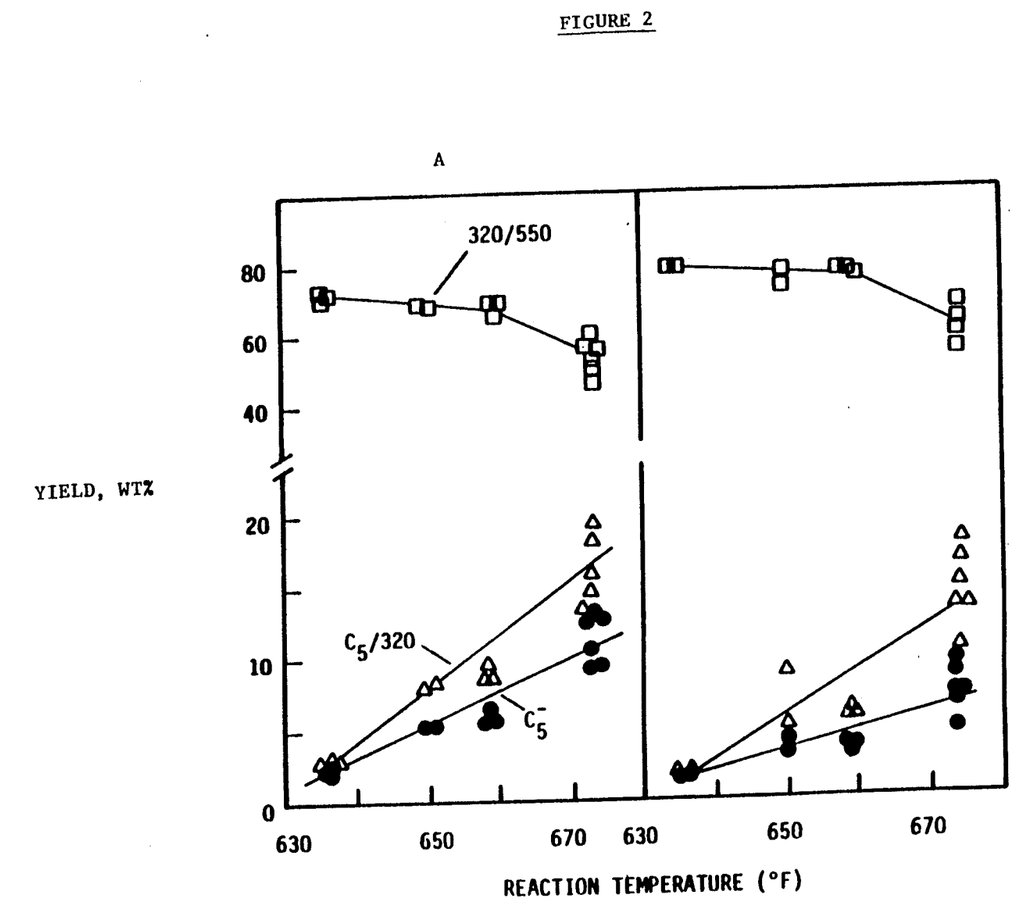
FIG. 2 shows yield patterns for Catalyst A on the left as compared to Catalyst A with 4 wt% silica surface modification on the right. Reaction conditions were 1000 psig, 0.5 LHSV, and 3000 SCF $H_2$/bbl feed treat gas rate. The silica modified catalyst showed lower gas yield ($C_5-$), lower naphtha yield ($C_5$/320° F.) and higher isomerate yield (320°/550° F.).
Figure 3A:
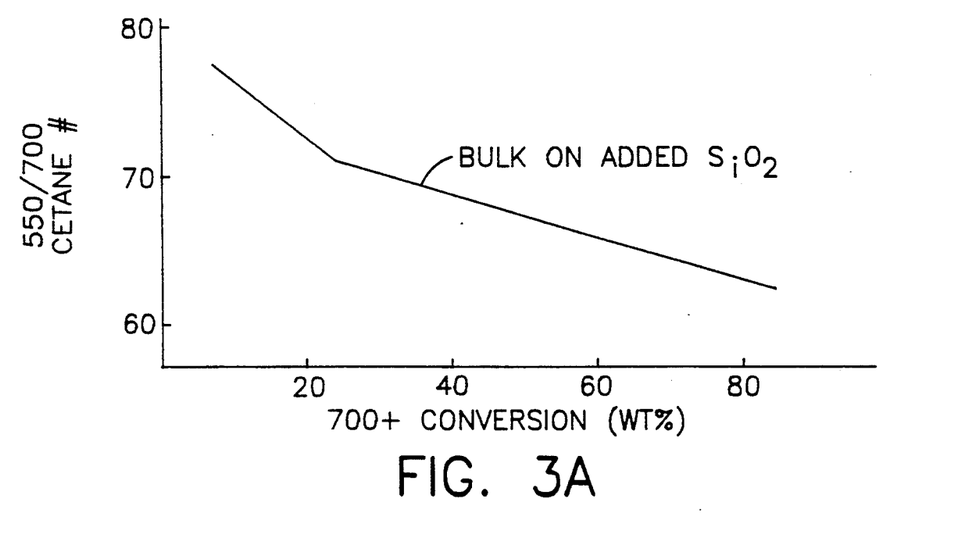
Figure 3B:
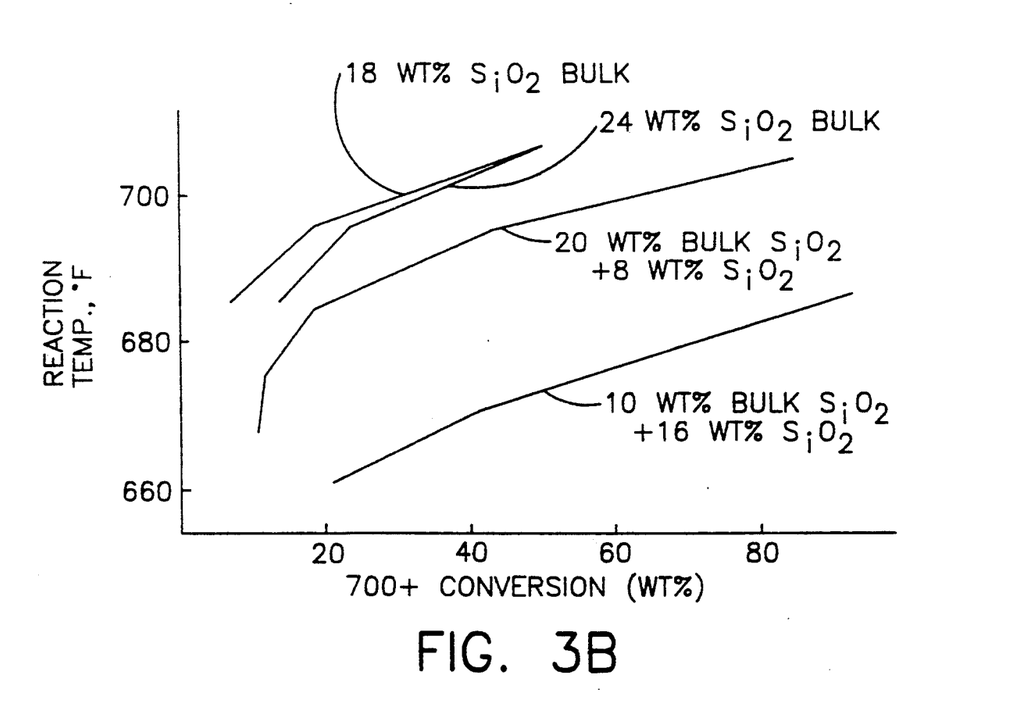
Figure 3C:
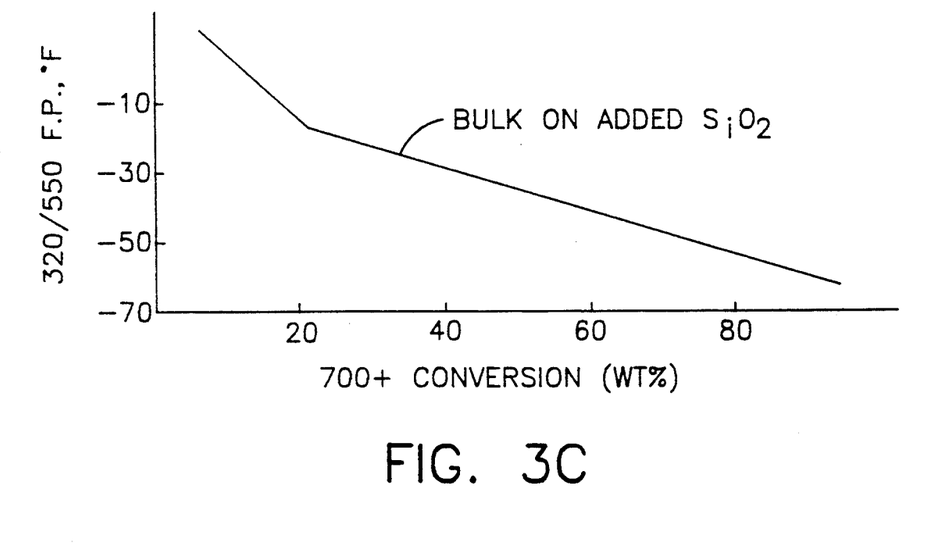

A further comparison is shown in FIG. 3 which summarizes reaction temperatures, jet freeze points, and diesel cetane numbers as a function of 700+ conversion for all four catalysts. The surface silica promoted catalysts were significantly more active than the bulk silica catalysts with comparable total silica and metal loadings.

EXAMPLE 4

Metals Impregnation After Surface Silica

Effective catalysts can be produced when this impregnation sequence is reversed. Silica addition to metals containing catalysts can be used to lower gas make during isomerization of a $C_{14}$-$C_{17}$ virgin distillate feed. We believe that this reduction in gas make would not be realized if silica was added prior to metals impregnation. Gas make is less problematic with heavier wax feeds, so the impregnation sequence appears to be less important in this circumstance. Table XI compares reaction data for two CoNiMo/10%SiO2-Al2O3 catalysts promoted with an additional 10 wt% surface silica. In catalyst F, the surface silica was added after metals impregnation, whereas in catalyst G, surface silica was incorporated prior to metals incorporation. Both surface silica containing catalysts were effective for converting Fischer-Tropsch wax to low pour point jet fuel, although catalyst F appeared to be somewhat more active.

TABLE IX

| CATALYST | (F) (8% SiO2/ CAT #3) | (G) (CoNiMo/10% SiO2/SiO2—Al2O3) |
|---|---|---|
| Rxn T (°F.) | 696 | 706 | 714 |
| 700+ Conversion (%) | 44 | 42 | 67 |
| Yields (wt %) | | | |
| C1/C4 | 2.4 | 1.3 | 5.2 |
| C5/320 | 4.7 | 6.3 | 10.4 |
| 320/550 | 21.1 | 22.8 | 34.1 |
| 550/700 | 31.8 | 26.1 | 30.5 |
| 700+ | 43.4 | 45.0 | 25.4 |

TABLE IX-continued

| CATALYST | (F) (8% SiO2/ CAT #3) | (G) (CoNiMo/10% SiO2/SiO2—Al2O3) | |
|---|---|---|---|
| Cold Flow Properties (F.) | | | |
| 320/550 Freeze Pt. | −31 | −27 | −49 |
| 550/700 Pour Pt. | −11 | 5 | — |

What is claimed is:

1. A catalyst composition comprising:
   a Group VIII metal;
   a support therefor of alumina or silica-alumina wherein the silica content is less than about 35 wt%;
   at least about 0.5 wt% silica other than the support silica;
   and a surface area of about 180–400 m²/gm.

2. The catalyst of claim 1 wherein the Group VIII metal is a noble metal.

3. The catalyst of claim 2 wherein the metal is platinum or palladium.

4. The catalyst of claim 1 wherein the Group VIII metal is a non-noble metal.

5. The catalyst of claim 4 wherein the metal is nickel, cobalt, or mixtures thereof.

6. The catalyst of claim 5 wherein the composition also contains molybdenum.

7. The catalyst of claims 3, 5, and 6 wherein the amount of silica which is other than support silica is about 1-25 wt%.

8. The catalyst of claim 7 wherein the other silica is about 2-12 wt%.

9. The catalyst of claim 1 having a pore volume of about 0.3-1.0 ml/g.

10. A process for preparing a catalyst comprising:
    (a) impregnating an alumina or silica-alumina support having no more than about 35 wt% silica with one or more Group VIII metals;
    b) treating the support with silica or a silica precursor to provide at least about 0.5 wt% silica on the surface of the support.

11. The process of claim 10 wherein the support is dried and calcined at temperatures of about 300° C.-500° C. in an oxygen containing gas subsequent to each of steps (a) and (b).

12. The process of claim 10 wherein step (b) precedes step (a).

13. The process of claim 10 wherein step (a) precedes step (b).

* * * * *